United States Patent [19]

Sales

[11] 4,050,957
[45] Sept. 27, 1977

[54] PROCESS FOR THE PASSIVATION OF FERROSILICON

[75] Inventor: Maurice Sales, Ville Longue, France

[73] Assignee: Societe Pyreneenne du Silico-Manganese, Paris, France

[21] Appl. No.: 620,742

[22] Filed: Oct. 8, 1975

Related U.S. Application Data

[63] Continuation of Ser. No. 345,468, March 27, 1973, abandoned, which is a continuation of Ser. No. 52,879, July 7, 1970, abandoned.

[30] Foreign Application Priority Data

July 10, 1969  France ............................... 69.23581

[51] Int. Cl.² ............................................. C23C 11/00
[52] U.S. Cl. ................................... 148/6.3; 148/6.35; 148/105; 148/110; 148/113; 427/216
[58] Field of Search ................ 148/6.35, 6.3, 24, 104, 148/105, 110, 112, 113; 427/59, 215, 216

[56] References Cited

U.S. PATENT DOCUMENTS

| 2,050,305 | 8/1936 | Frey et al. ............................ 148/110 |
| 2,110,717 | 3/1938 | Sellers .................................. 148/6.14 |
| 2,873,512 | 2/1959 | Robinson ............................ 29/182.5 |
| 3,169,851 | 2/1965 | Fleming, Jr. et al. .......... 148/6.35 X |

FOREIGN PATENT DOCUMENTS

| 395,148 | 6/1938 | Canada |
| 1,245,680 | 7/1967 | Germany ............................. 148/6.14 |

*Primary Examiner*—Ralph S. Kendall
*Assistant Examiner*—Charles R. Wolfe, Jr.
*Attorney, Agent, or Firm*—Cushman, Darby & Cushman

[57] ABSTRACT

A process for the passivation of discrete particles of ferrosilicon containing 30–90% by weight silicon comprises contacting the particles with a gaseous oxidizing agent at a temperature between 800°–1150° C for a time ranging between 1–12 hours. The treated particles can be admixed with a binding agent to form a paste which, in turn, is used as a coating for shielded arc electrodes.

5 Claims, 1 Drawing Figure

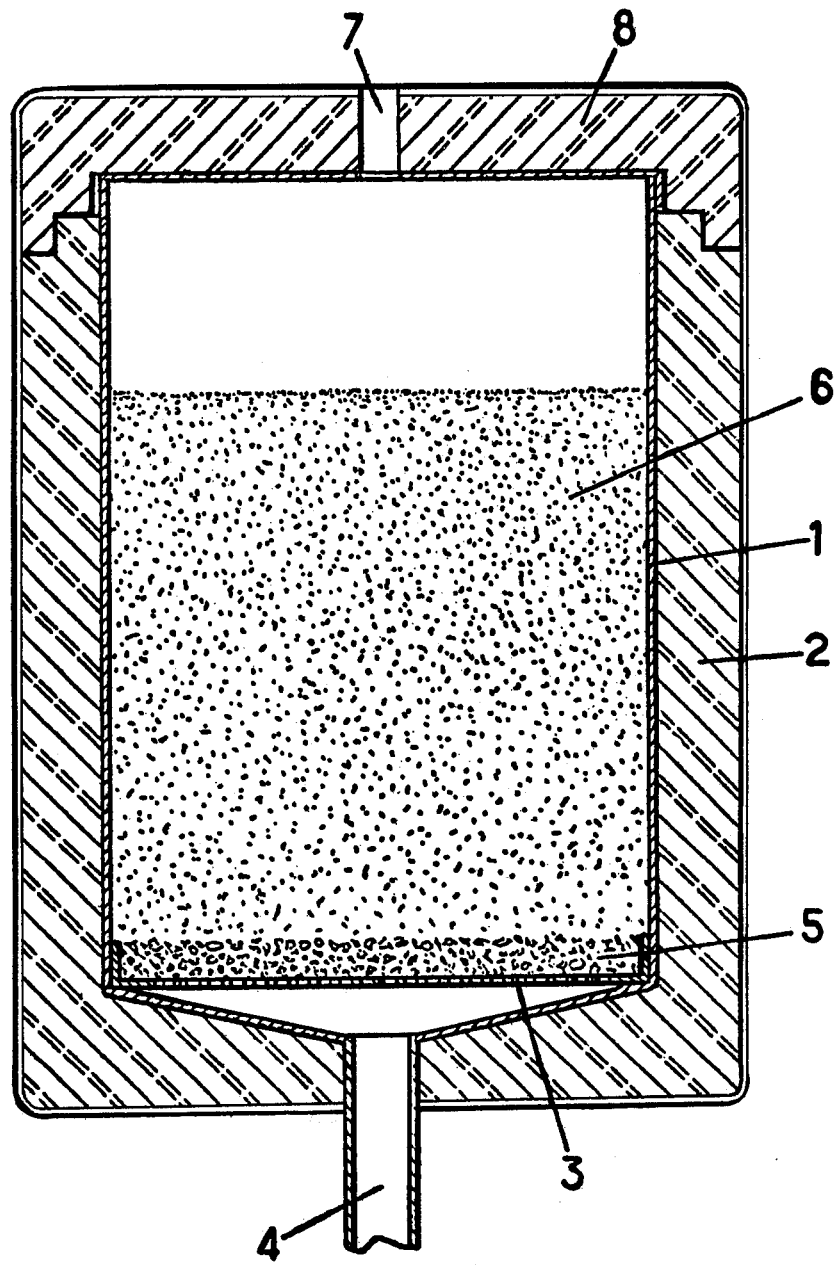

PROCESS FOR THE PASSIVATION OF FERROSILICON

This is a continuation, of application Ser. No. 345,468 filed Mar. 27, 1973, now abandoned which is a continuation of Ser. No. 52,879, filed July 7, 1970, now abandoned.

The present invention relates to a new process for the passivation of ferrosilicon and, more particularly, to the treatment of discrete ferrosilicon particles with an oxidizing agent, the thus treated ferrosilicon particles being advantageously employed in a coating composition for shielded arc electrodes.

Heretofore, ferrosilicon containing 30 to 90% by weight silicon, has been used in a powdered form together with a binder such as an alkaline silicate to provide a coating composition for shielded arc welding electrodes.

However, it has been observed that ferrosilicon in the presence of an aqueous alkaline solution and particularly an aqueous alkaline silicate, gives rise to a reaction accompanied by the release of hydrogen, which disadvantageously causes cracks in the resulting coating on the welding electrodes.

In an effort to obviate this disadvantage, it has been proposed to use atomized ferrosilicon particles, rather than powdered ferrosilicon since such particles are spherical in form, having, consequently less total surface area, which thereby limits the intensity and the extent of the reaction with the aqueous alkaline solution. It has also been proposed, in an effort to avoid a reaction of the ferrosilicon with the alkaline media, to subjec the ferrosilicon to a pre-treatment comprising contacting the ferrosilicon particles with an aqueous solution of an alkaline hydroxide, along or with an alkaline earth permanganate or dichromate, washing the thus treated ferrosilicon with water and drying the same. However, none of the proposed treatments have provided a satisfactory reduction of the release of gas which is produced when the ferrosilicon is contacted with an aqueous alkaline solution.

It has now been found that the release of such gas produced when ferrosilicon particles are contacted with alkaline solutions can be substantially eliminated or minimized if the powdered ferrosilicon, having a particle size less than 0.3 mm, is subjected to an oxidizing treatment at a temperature between 800 and 1150° C for a period of time ranging between 1 to 12 hours, said duration being a function of the temperature and of the nature of the gaseous oxidizing agent which is used.

The said oxidizing agent can be air, oxygen, steam or carbon dioxide and, if desired, it can include a gaseous inorganic acid, such as hydrochloric acid in amounts ranging from about 5 to 15 weight percent, based on the total weight of the gaseous oxidizing agent.

When air or oxygen is used as the oxidizing agent, it is sufficient to treat the ferrosilicon for 2 hours at 1100° C to attain excellent passivation, whereas as 850° C it is necessary to continue the said treatment for 12 hours.

The treatment of ferrosilicon with the oxidizing agent can be effected in any suitable apparatus such as a rotary furnace, a plate furnace, or any other furnace which permits heating of a powder at high temperature while maintaining intimate contact between the said powder and a gas. Preferably a fluidized bed technique is used in an apparatus shown in the accompanying drawing.

As shown in the figure, the apparatus comprises a vessel 1 made of stainless steel which is disposed in a furnace 2 furnished with a grilled bottom 3, below which there is provided gas intake 4. The grill 3 is surmounted by a layer 5 of crushed and amalgamated refractory material, which can be, for example, alumina, corundum or "Inox Poral" steel. Above the said layer 5, the powdered ferrosilicon 6 is introduced and brought to the desired temperature at the same time that gas is admitted via intake 4 under sufficient pressure to effect suspension of the particles of ferrosilicon. The flow of gas passes vertically through grill 3, layer 5 and fluidized bed 6 and is vented to the outside through port 7 in cover 8.

The efficiency of the process of the invention is demonstrated by the two following tests.

TEST NO. 1

In a glass tube 18 mm in diameter and 150 mm long, there is introduced 2 g of the powdered ferrosilicon and 14 cc of an aqueous solution of sodium silicate obtained by dissolving two parts by volume of sodium silicate (at 47° Be $SiO_2/Na_2O$ = 2.9) in one part volume water, and the whole is brought to a temperature of 90° C. The gas which is released is collected in a eudiometer.

TEST NO. 2

In a 50 cc Erlenmeyer flask there is introduced a 25 g sample of ferrosilicon and 25 cc of a 10% potassium hydroxide solution. The whole is placed in a thermostat at 50° C and the release of gas is measured.

The amount of gas released, noted in both of these tests, allows, by comparison with an untreated alloy sample, the judgement of the degree of passivation of the treated metal.

The following table indicates the results obtained with different samples of 45% ferrosilicon having a particle size less than 0.210 mm, which samples were subjected to the conditions of test No. 1.

| Sample | Gaseous Volume collected at the end of | | | |
|---|---|---|---|---|
|  | 30 mins | 1 hr | 2 hrs | 4 hrs |
| Untreated ferrosilicon | 50-60 cc | — | — | — |
| Ferrosilicon particles treated at 850° C with oxygen for 12 hours | — | 2 cc | 4 cc | 12 cc |
| Ferrosilicon particles treated at 900° C with oxygen for 10 hours | — | 2 cc | 3 cc | 8 cc |
| Ferrosilicon particles treated at 1100° C with oxygen for 2 hours | — | 2 cc | 2.5 cc | 6 cc |

A sample of particles having essentially the same dimensions were subjected to test No. 2, and at the end of one hour of contact with the potassium hydroxide solution, yielded the following results for comparison.

| Sample | Volume of Gas Recovered |
|---|---|
| Untreated ferrosilicon | 23 to 35 cc |
| Ferrosilicon treated at 850° C with air for 12 hours | 3 to 5 cc |

The following example describes a method of carrying out the process of the present invention.

EXAMPLE

Into a vertical cylindrical furnace, 85 cm in diameter and 1.30 m high, there is placed a charge of 1300 kg of powdered ferrosilicon which contains 44.9% silicon, 75% of the said particles have a dimension ranging between about 0.250–0.060 mm. The charge is fluidized for 12 hours at 850° C using a jet of air compressed at 1.2 bars and at a flow rate of 5 m³ per hour. The particle size of the charge was not modified after cooling. Samples of the thus treated ferrosilicon were subjected to tests 1 and 2 described above as were equal samples of essentially the same, but untreated, ferrosilicon particles.

The following results were observed:

| Sample | Test No. 1 Gas volume collected at the end of | | | Test No. 2 Gas Volume collected at the end of |
|---|---|---|---|---|
| | 1 hr | 2 hrs | 4 hrs | 1 hour |
| Untreated ferrosilicon alloy | 136 cc | — | — | 28 cc |
| Treated ferrosilicon | 0.5 cc | 4 cc | 9 cc | 4 cc |

The ferrosilicon particles treated according to the process which is the subject of the present invention can be used for making coating pastes, particularly for welding electrodes. These pastes, obtained by impregnation of the powdered ferrosilicon with an aqueous solution of alkaline silicates, provide the extremely advantageous property of not giving rise to a substantial release of hydrogen in the course of their preparation. It follows that the coating which is obtained does not present troublesome cracks or fissures which are observed in the coatings made with untreated ferrosilicon. The paste can be produced by admixing the treated ferrosilicon particles with about 5 to 40 weight percent of a binding agent comprising an aqueous alkaline silicate solution, based on the weight of the ferrosilicon particles. The core of the electrode, can, of course, be made of any conventionally employed metal or carbon and the electrode size can also be one which is conventionally employed, for instance, one having a size ranging from about 1/16 to 5/16 inch.

What is claimed is:

1. A process for the passivation of discrete particles of ferrosilicon containing 30 to 90% by weight silicon comprising contacting said ferrosilicon particles with a gaseous oxidizing agent containing a gaseous inorganic acid, said gaseous oxidizing agent being selected from the group consisting of air, oxygen, steam or carbon dioxide, at a temperature between about 800° and 1150° C for a period of time ranging between about one and twelve hours.

2. The process of claim 1 wherein the inorganic acid is hydrogen chloride.

3. Ferrosilicon powder obtained in accordance with the process of claim 1.

4. A paste for coating welding electrodes comprising a mixture of ferrosilicon particles produced in accordance with claim 1 and an aqueous solution of an alkaline silicate.

5. A welding electrode coated with a paste comprising a mixture of ferrosilicon particles produced in accordance with claim 1 and a binding agent comprising an aqueous solution of an alkaline silicate.

* * * * *